June 25, 1963  JEAN-CLAUDE METTETAL ETAL  3,095,095

MANIPULATOR

Filed April 20, 1960

INVENTORS
JEAN-CLAUDE METTETAL
GEORGES FRITZ
BY
Woodhams, Blanchard & Flynn
ATTORNEYS ┌─────────────────────────────────────────────┬─────────────────────────────────┐

United States Patent Office 3,095,095
Patented June 25, 1963

---

3,095,095
MANIPULATOR
Jean-Claude Mettetal and Georges Fritz, Paris, France, assignors to Electricite de France—Service National, Paris, France, a French organization
Filed Apr. 20, 1960, Ser. No. 23,474
Claims priority, application France July 28, 1959
23 Claims. (Cl. 214—1)

The present invention has for its object a handling apparatus adapted to position, convey or remove an article of any type inside a space which can be reached through a tunnel.

Modern techniques have made the use of such handling apparatus necessary in various fields and, in particular, in the field of nuclear energy. It is a known fact that in certain reactors in which nuclear energy is used, the radioactive bars are stacked up vertically inside an active core of the reactor and that said bars should be handled from the inside of the active core, when it is desired to provide, for instance, for their replacement.

Such operations may lead to mishaps leading to a possible release of one of the bars which drops into the bottom of the reactor and this has for its result a stoppage of the reactor and considerable losses of time for the removal of the bar after it has thus dropped into the bottom of the vat. Said removal corresponds, as a matter of fact, to problems which are almost insoluble, since the bar is located inside a chamber connected outwardly only through one or more tunnels, while entrance into the chamber is forbidden, because of the danger due to radiation.

A further difficulty arises also from the fact that often the bar breaks when it drops and it is therefore necessary to remove no longer a solid body which may be readily grasped, but a number of more or less bulky parts together with finely subdivided dust distributed over the surface at the bottom of the active core.

The present invention has for its object to provide the staff entrusted with the inspection and handling of the nuclear reactor with a handling apparatus which allows grasping through one of the tunnels leading to the chamber any radioactive bar which may have fortuitously dropped into the bottom of the reactor and to remove said bar or the fragments thereof in the case of a breaking of the bar.

Obviously, the field of application of our invention is not limited to the example given hereinabove and, in contradistinction, the handling apparatus according to the invention may be of use each time it is necessary, for the purposes of nuclear or any other technique, to handle an article, even in a finely distributed condition, inside a chamber which is accessible with difficulty.

To this end, the handling apparatus according to our invention includes a first arm carrying means adapted to ensure its movement in the tunnel, a second arm pivotally secured to the front end of said arm, means for ensuring a rotation of the second arm with reference to the first arm, a third arm pivotally secured to the second arm round an axis perpendicular to the pivotal axis of said second arm, means ensuring the rotation of the third arm with reference to the second arm, clamping means carried by the third arm and means controlling the opening and the closing of the clamping means.

It is thus apparent that a handling apparatus is thus provided which is adapted to move longitudinally inside a tunnel through the agency of its first arm, while the clamping means on same may reach any point of the chamber considered upon rotation in a first plane of the second arm with reference to the first arm and in a plane perpendicular to said first plane of the third arm with reference to the second arm. Once the clamping means have been thus set in position, the latter may take hold of or release the article or body to be removed, or set it in the desired position.

It is also possible to make the above-defined handling apparatus introduce into the chamber considered a suction pipe held fast between the jaws of the clamping means and extending longitudinally along the handling apparatus, so as to shift thereafter said pipe above the surfaces carrying the finely subdivided particles.

According to a preferred embodiment of our invention, there is provided a drawer longitudinally slidable with reference to the first arm and to the end of which may be secured a container. Through this arrangement, it is possible, when the clamping means have grasped an article to shift the container longitudinally with reference to the arms and to position it underneath the clamping means, following which said clamping means are operated so as to lay the article grasped by them inside the container. The rearward movement of the handling apparatus is thus furthered and it is also possible to grasp and to lay inside the container several articles or parts of articles, without it being necessary for each operation to shift the handling apparatus out of the tunnel.

According to a further improvement of the invention, the sliding drawer arranged underneath the handling apparatus carries slidingly a telescopic pipe rigid at one end with the first arm and at its other end with a nozzle secured to the front of the drawer. Said improvement allows cutting out the necessity of a pipe extending longitudinally throughout the length of the handling apparatus. It is sufficient, as a matter of fact, to insert in the nozzle secured to the front of the drawer a yielding pipe adapted to be grasped by the clamping means, whereby the cleaning and the exhaust of the waste material is ensured. The fact that the section of the pipe inside the drawer is of a telescopic structure allows operating at variable distances from the stationary point at which the handling apparatus is located.

Preferably, a same member rigid with the drawer ensures securing selectively to the latter a container or the terminal nozzle of the telescopic pipe. The handling apparatus thus available may serve as desired and upon mere replacement of the container by the nozzle or reversely for handling complete articles or finely distributed particles.

Our invention will be readily understood, reference being made to the following description and to the corresponding accompanying drawings illustrating, by way of example and in a non-limiting sense, a preferred embodiment of said invention. In said drawings:

FIG. 4 is a cross-section through line IV—IV of FIG. 2a.

Figure 1:
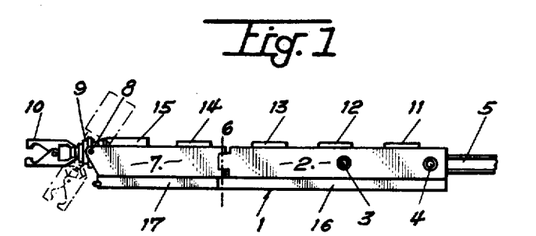
FIG. 1 is a general small-scale view of a handling apparatus according to our invention.

Turning first to FIG. 1, it shows a handling apparatus designated by the general reference number 1, said handling apparatus including chiefly an arm 2 carrying on each side two rollers 3 and 4 adapted to run in U-shaped rails, of which one is shown at 5.

To the front end of the arm 2 is pivotally secured, round a vertical spindle 6, an arm 7 to which a third arm 9 is, in its turn, pivotally secured round a horizontal spindle 8. The arm 9 includes chiefly clamping means 10 and means for controlling said clamping means. FIG. 1 also shows the motors 11, 12, 13, 14 and 15. Lastly, underneath the arms 2 and 3 is arranged a sliding drawer 16 adapted to carry at its end a container 17 open at its other end or the like auxiliary member.

As provided by the arrangement to be described with further detail hereinafter with reference to the following figures of the drawings, the motor 11 ensures the shifting of the sliding drawer 16 longitudinally of the arm 2, while the motor 12 drives the roller 3 and the symmetrical roller 3', which is not shown, and the motor 13 controls the rotation of the arm 7 round its pivotal axis 6. As to the motor 14, it ensures the rotation of the arm 9 round its pivotal axis 8 and the motor 15 controls the opening and the closing of the clamping means.

It is thus apparent that the handling apparatus thus designed allows, through the rotation of the motor 12 in either direction, a longitudinal shifting of the apparatus inside a tunnel, as provided by the running of the rollers 3 and 4 over the rails 5. After execution of said longitudinal movement, it is possible, through rotation of the motor 13, to make the system of arms 9 and 7 projecting beyond said tunnel execute a pivotal movement round the axis 6, so as to position the clamping means 10 above the body or bodies to be handled. Finally, through a rotation of the motor 14, it is possible to make the arm 9 execute a pivotal movement round the axis 8, so that the clamping means may be positioned at the desired level. Lastly, a rotation of the motor 15 provides for the opening and closing of the clamping means 10, which allows taking hold of an article. After returning the arms 9 and 7 into alignment, it is possible, through rotation of the motor 11, to shift the sliding drawer 16 longitudinally, so as to set the container 17 underneath the clamping means 10. The motor 15 is then started again, so as to open the clamping means and to allow the articles grasped by the latter to drop into the container. If a second article is then to be taken hold of, the same operations may be executed again and it is finally possible to perform a series of movements in a direction opposed to the preceding movements, whereby the handling apparatus is caused to move out of the tunnel inside which it has been engaged and this will allow removing the article or articles lying in the container 17. Obviously, the handling apparatus may serve also under the same conditions for laying articles inside a space which can be reached only with difficulty.

In the case where it is desired to handle subdivided articles which cannot be grasped by the clamping means, such as pulverulent or waste material, there is substituted for the container 17 the output nozzle of a suction pipe extending along the apparatus or inside the sliding drawer 17 and connected outwardly to suction means. Through operations similar to the preceding operations and after the sliding drawer 16 has been shifted forwardly, the clamping means 10 may grasp said output nozzle of the suction pipe and shift it over the area covered by pulverulent or waste material. The suction means being started, this will lead to the exhaust of the particles, the extent of subdivision of which is too considerable for them to be grasped directly by the clamping means.

The handling apparatus allows thus grasping, for instance inside an atomic reactor, a bar which may have dropped fortuitously to the bottom of the reactor through the introduction of said handling apparatus inside a tunnel provided for this purpose. If the bar is broken, its particles may be removed through the agency of the suction pipe.

Figure 2:
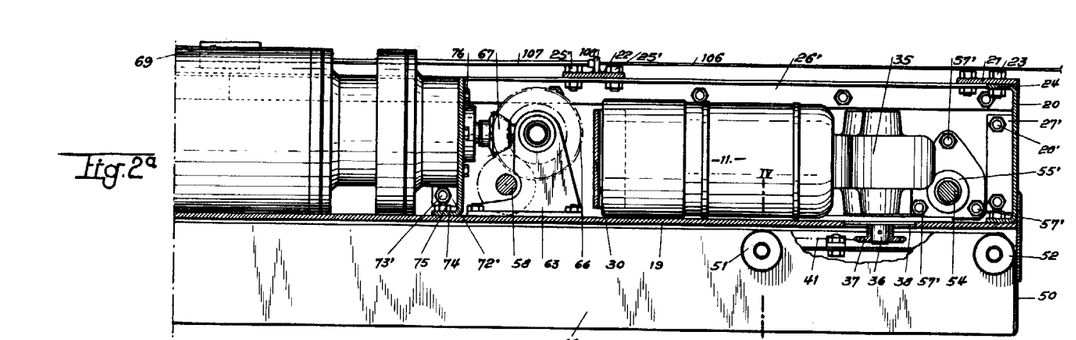
FIGS. 2a, 2b and 2c are lateral, partly sectional views of the successive elements forming the handling apparatus, on a larger scale.
Figure 3:
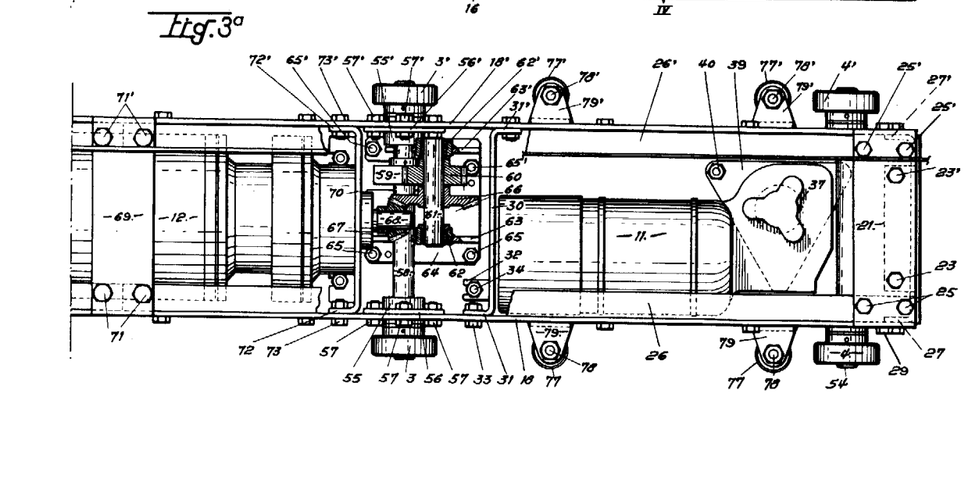
FIGS. 3a, 3b and 3c are corresponding views from above, also partly sectional and on a larger scale, of said elements of the handling apparatus.

We will now refer more particularly to FIGS. 2a and 3a showing the parts arranged inside the arm 2 and providing for the longitudinal movements of said arm with reference to the tunnel and of the sliding drawer 16 with reference to the arm 2.

As clearly shown in said figures, the arm 2 includes chiefly two side walls 18 and 18' and a bottom 19. The rigidity of the whole system is ensured by a terminal plate 20 and by bridge members 21 and 22 secured by bolts 23 and 23' to a folded flange 24 of the plate 20 and by bolts 25 and 25' to the angle bars 26 and 26' rigidly secured to the side walls 18 and 18'. Similarly, the plate 20 includes two further folded flanges 27 and 27' connected with the side walls 18 and 18' through the bolts 28 and 28'. There is also provided a transverse plate 30 including a number of flanges 31, 31' and 32 which allow its securing through bolts 33, 33' and 34 to the side walls 18 and 18' and to the bottom 19.

Inside the casing thus formed is housed an electric motor 11 driving, through the speed-reducing gear 35 and the output shaft 36, the toothed wheel 37 carried underneath the bottom 19. To this end, the bottom 19 is provided with a port 38, while a stiffening plate 39 is secured to it through a number of bolts, of which one is shown at 40. The wheel 37 drives a chain illustrated diagrammatically by a dot-and-dash line 41 and which extends in parallelism with the bottom 19 of the arm, said chain engaging at its other end a pinion 42 shown in FIGS. 2b and 3b. Said pinion is freely revolvable round a spindle 43 which is suitably held in position by nuts and safety nuts 44.

Figure 4:
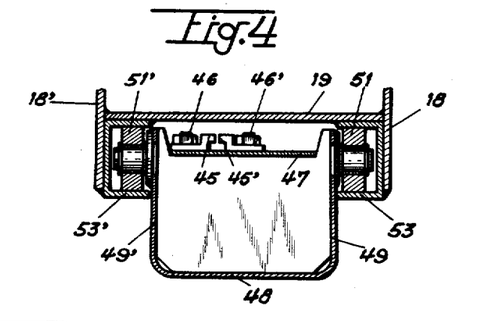

The movement of the chain controlled by the pinion 37 serves for the driving of the sliding drawer 16 through the agency of driving means which are illustrated more clearly in FIG. 4 and include simply two jaws 45 and 45' adapted to be engaged by the chain 41 and held in position by bolts 46, 46' on a plate 47 rigid with the sliding drawer. It is apparent that through this arrangement and upon starting of the motor 11 in either direction, a longitudinal movement of the sliding drawer 16 in a corresponding direction with reference to the arm 2 will be obtained through the transmission formed by the pinion 37, the chain 41 and the jaws 45, 45'.

The sliding drawer 16 of a rectangular cross-section includes a bottom 48 and two side walls 49 and 49', together with the above-mentioned plate 47. In order to increase the rigidity of the drawer, its different parts may be welded together or secured together in any other suitable manner. The longitudinal movements of the sliding drawer 16 with reference to the arm 2 are furthermore guided by two pairs of rollers 51, 51' and 52, 52', which are mounted loose on corresponding spindles rigid with the side walls 49 and 49' of the sliding drawer. The rollers are guided to either side of the drawer by channel irons 53, 53' forming rails welded or otherwise secured to the side walls 18 and 18' forming the arm 2 and to the bottom 19 of the latter. It will be remarked that the rollers 51, 51' and 52, 52' engage the corresponding rails 53, 53' with a certain clearance so as to cut out any too large frictional resistance.

We will now describe while still referring to FIGS. 2a and 3a, the members controlling the longitudinal movements of the arm 2 with reference to the tunnel inside which it is located. These means include chiefly the two pairs of rollers 3, 3', 4, 4', of which two, 3, 3', are driven by the motor 10, while the two others, 4, 4', are loose. As shown in the drawings, the rollers 4, 4', are fitted on a shaft 54 carried in bearings 55, 55' rigid with the plates 56, 56' secured to the side walls 18, 18' of the arm 2 through the agency of bolts 57, 57'. The rollers 3 and 3' are similarly fitted on a shaft 58 carried by the side walls 18, 18' of the arm 2 through arrangements similar to the preceding arrangements and including plates 56, 56' carrying the bearings 55, 55' and secured by bolts 57, 57'.

To the shaft 58 carrying the rollers 3, 3' is keyed a pinion 59 adapted to be driven by a pinion 60 keyed to a shaft 61. The shaft 61 is carried in two bearings 62, 62' carried by the vertical flanges 63, 63' which are rigid in their turn with a plate 64 secured through bolts 65, 65' to the bottom 19 of the arm 2. To the shaft 61 is keyed a bevel pinion 66 meshing with another bevel pinion 67 keyed to the output shaft 68 of the motor 12 carried, as already mentioned, inside the arm 2 and held in position by the securing plates 69 and 70. The plate 69 is secured by bolts 71, 71' to the angle bars 26, 26' rigid with the side walls 18, 18'. On the other hand, the plate 70 includes two folded flanges 72, 72' which ensure its securing to the sidewalls 18 and 18' through the agency of the bolts 73 and 73'. It also includes a flange 74 which allows securing it through bolts 75 to the bottom 19. The bolts 76 at the output end of the motor 12 ensure the securing of the latter to the plate 70.

It is thus apparent that, upon rotation of the motor 12, the transmission from said motor through the elements 68, 67, 66, 61, 60, 59 and 58 ensures the drive of the rollers 3, 3' in the direction corresponding to the direction of rotation of the motor. The arm 2 will thus be shifted along the rails 5 shown in FIG. 1 through the driven rollers 3, 3' cooperating with the freely revolving rollers 4, 4'.

The movements of the arm 2 are furthermore guided transversely by a number of rollers 77, 77' fitted on vertical spindles 78, 78' which are, in their turn, carried by lugs 79, 79' formed by the ends folded at 90° of small plates welded to the sidewalls 18, 18'. Said rollers, of which four are shown in FIGS. 2a and 3a and two are shown in FIGS. 2b and 3b, are adapted to to cooperate with the vertical walls of the tunnel in which the handling apparatus moves.

Figure 2B:
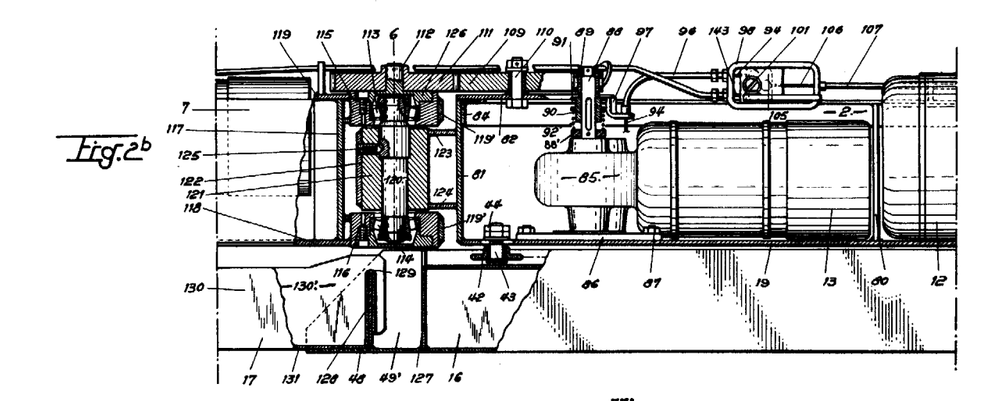
Figure 3B:
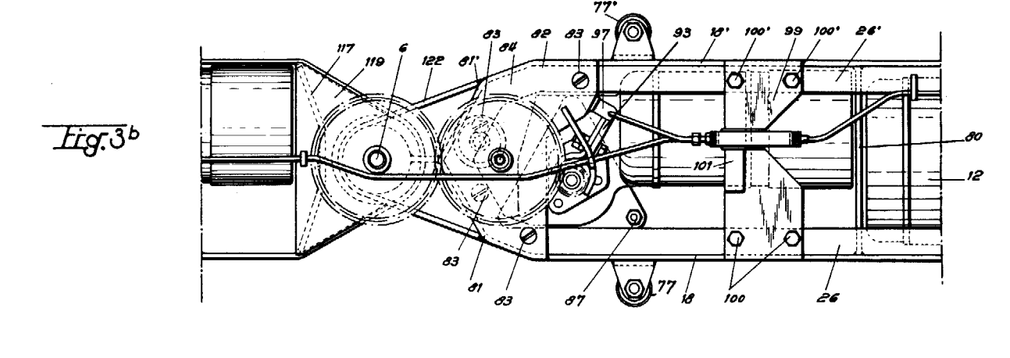

Turning more particularly, now, to FIGS. 2b and 3b, it is apparent that the latter show the front section of the arm 2 and the rear section of the arm 7, said arms being pivotally secured to each other round the axis 6. Said FIGS. 2b and 3b show again the components of the arm 2 which have been described precedingly with reference to FIGS. 2a and 3a, to wit, the sidewalls 18, 18', the bottom 19 and the angle bars 26, 26'. Said figures also show the end of the motor 12 together with a transverse wall 80 welded to the sidewalls and to the bottom of the arm 2, so as to form the rear partition closing a compartment intended for the housing of the motor 13. Said compartment housing said motor 13 is bounded forwardly by the two terminal portions 81 and 81' of the sidewalls 18, 18' which extend obliquely inwardly, so as to meet each other in the plane of symmetry of the arm 2, the front part of the compartment being closed upwardly by a plate 82 secured by bolts 83 to the front sections 84, 84', which are also convergent, of the angle bars 26.

Figure 5:
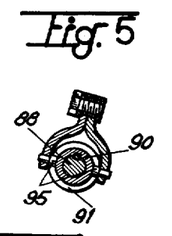
FIGS. 5, 6, 7, 8 and 9 show various members forming part of the handling apparatus.

The motor 13 is provided with a conventional speed-reducing gear 85 at its outer end, said gear being secured to the bottom 19 by a plate 86 held on said bottom by the bolts 87. The output shaft 88 of the motor 13 drives a small diameter pinion 89 through the agency of a clutch including a sliding gear 90 driven into rotation by the shaft 88 and of which a tenon, which is not shown, is adapted to engage a corresponding notch in the pinion 89. The sliding gear 90 is provided with a groove 91 through which it is moved against the action of an elastic member 92 abutting against a disc 88' rigid with the shaft 88 by a bell crank 93 which is controlled in its turn by a cable 94. The members controlling the clutch are more clearly illustrated in FIGS. 5 and 6 of the accompanying drawings showing the fork, the ends of which are provided with two projections 95 engaging the groove 91 of the sliding gear 90.

The cable 94 is adapted to move inside a sheath 96, one end of which is held by a bracket 97 fitted on the plate 82, while its other end is held by the input of the casing 98 carried on a transverse bridge member 99 connected with the angle bars 26, 26' through bolts 100, 100'.

Figure 7:
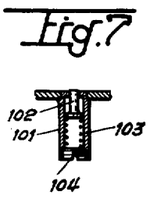

The casing 98 includes a plug illustrated with further detail in FIG. 7 which shows the actual plug 102, the tube 101 enclosing the same, the elastic member 103 urging said plug outwardly and the closing screw 104. Inside the casing 98, the cable 94 is secured to attaching means 105 adapted to slide under the control of a cable 106 carried inside a sheath 107 shown also in FIGS. 2a and 3a, said sheath stopping in registry with a bracket 108 rigid with the small bridge member 22; beyond said bracket, the cable 106 extends towards the outside of the tunnel.

The pinion 89 meshes with a pinion 109 mounted on a shaft 110 secured to the plate 82. The pinion 109 meshes, on the other hand, with a pinion 111 keyed to a shaft 112 rigid with the arm 7 and coaxial with the pivotal axis 6. As illustrated, the motor 13, when it operates in either direction, drives, through the agency of the transmission 85—88—90—89—109 and 111, the shaft 112 rigid with arm 7, so as to make said arm 7 rock round the pivotal axis 6 in the desired direction.

This, of course, is true whenever the transmission clutch is engaged by a tractional stress exerted on the cable 106 and transmitted to the cable 94 through the agency of the attaching means 105. It is possible to disconnect the transmission, in which case the arm 7 may turn freely round the pivotal axis 6. This free rotation may be of interest in the case of inoperativeness of one of the motors, so as to allow the removal of the handling apparatus. As a matter of fact, this removal is allowed since the arm 7 is free and returns into alignment with the arm 2 when it abuts against the terminal portion of the tunnel.

As concerns the means allowing the pivotal arm 7 to turn round the axis 6, they include two conventional roller bearings 113 and 114, of which the outer races 115 and 116 are rigid with the components of the arm 7, to wit: the rear plate 117, the bottom plate 118 and the upper plate 119. The members connecting said races with the arm 7 form overhanging volumes closed by the vertical walls 119'.

The roller bearings 113 and 114 are fitted over the shaft 120 which is held inside a sleeve 121, which latter is welded to an overhanging extension of the arm 2, constituted by a vertical suitably shaped casing 122 associated with two horizontal plates 123 and 124. A screw 125 secures said casing to the shaft 120.

To the outer race 115 of the roller bearing 113 is screwed furthermore a plate 126 rigid with the shaft 112 to which is keyed the pinion 111, so as to provide the drive of the arm 7 through said pinion 111.

FIGS. 2b and 3b also show partly cross-sectionally the front portion of the sliding drawer 16 and the rear portion of the container 17. It is apparent that the sliding drawer 16 is bounded by a plate 127 to the front of which extend the sidewalls 49 and 49' and its bottom 48. To these three parts of the container is welded a transverse vertical plate 128 over which is fitted a plate 129 folded into the shape of a very flat reversed U, so as to cap said plate 128, the U-shaped plate 129 being rigid with the sidewalls 130 and 130' and with the bottom 131 of the container.

Figure 2C:
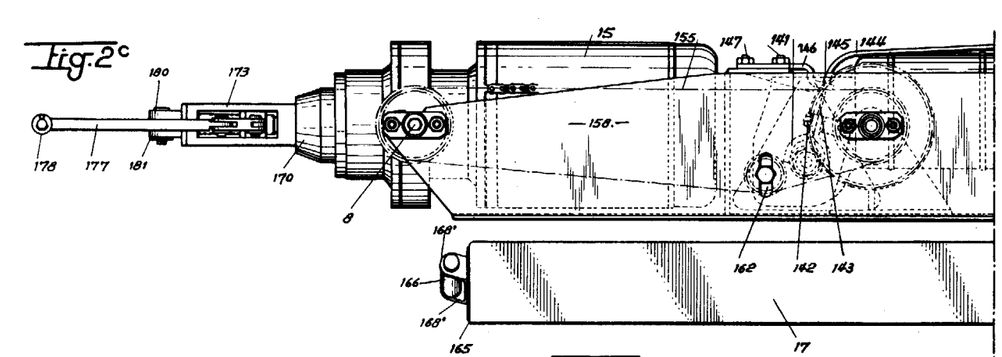
Figure 3C:
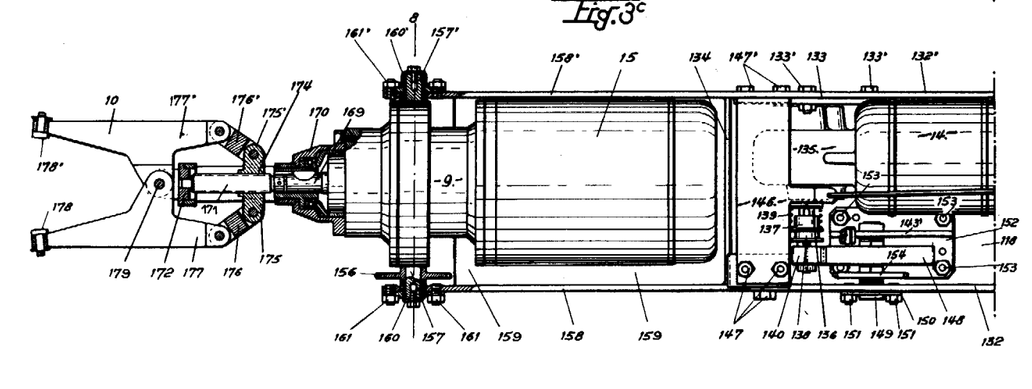

We will now refer more particularly to FIGS. 2c and 3c which illustrate the front section of the arm 7 and of the container 17 together with the arm 9. As concerns the front section of the arm 7, the latter includes chiefly a compartment constituted by the sidewalls 132 and 132', the bottom 118 and two terminal plates, of which the plate 117 has already been described with reference to FIG. 2b, while the other terminal plate 134 is welded across the sidewalls and the bottom of the arm 7. The sidewall 132' is reinforced by a plate 133 secured by bolts 133'. Inside the compartment thus defined in the arm 7 is housed the motor 14 with its speed-reducing gear 135, the output shaft of the reducing gear 136 incorporating a clutch similar to that fitted on the output shaft 88 of the motor 13. Said FIG. 3c shows, as a matter of fact, the clutch including the sliding gear 137 provided with a groove 138 and a spring 139 urging the sliding gear into engagement with the pinion 140. A fork 141 provides for the disengagement of the clutch, said fork being pivotally secured to an arm 142 fitted on a plate 143', the position of which will be defined hereinafter.

Figure 6:
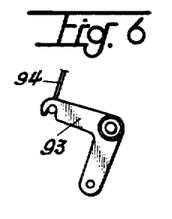

The fork is controlled by an arm which is not illustrated, but is of the same type as the arm illustrated in FIG. 6 and which, in its turn, is controlled by a cable 143 projecting out of its sheath 144 at a point in registry with a bracket 145 rigid with a small bridge 146 secured by bolts 147, 147' to the sidewalls of the arm 7. The sheath 144 extends up to the casing 98 shown in FIGS. 2b and 3b and described hereinabove, and inside said casing, the cable 143 is secured to the attaching means 105 in a manner similar to the cable 94.

It is apparent, from the preceding disclosure, that through action on the cable 106, the output end of the motor 14 is disconnected together with the output end of the motor 13.

The pinion 140 provides for the drive of a pinion 148 keyed to a shaft 149 carried, on the one hand, by the plate 143' already mentioned and, on the other hand, by the plate 150 secured by bolts 151 to the sidewall 132 in which, of course, a suitable port has been provided for this purpose. The plate 143' is rigid with a carrier plate 152 secured to the bottom 118 of the compartment by means of bolts 153.

To the shaft 149 is keyed a wheel 154 which provides for the drive of a chain illustrated diagrammatically by the dot-and-dash line 155, which chain ensures, in its turn, the rotation of the wheel 156 keyed to a stub shaft 157, the axis of which coincides with the pivotal axis 8. The stub shaft 157 extends through the front portion of a second compartment formed in the arm 7 by suitably outlined extensions 158 and 158' of the sidewalls 132 and 132' and an extension 159 of the bottom 118. There is provided a stub shaft 157' arranged symmetrically with reference to the stub shaft 157, said aligned stub shafts being fitted in the front ends of the extensions 158 and 158', as provided by the bearings 160 and 160' secured by the bolts 161 and 161'. To the stub shafts 157 and 157' is keyed the last arm 9 to be described hereinafter.

Figure 8:
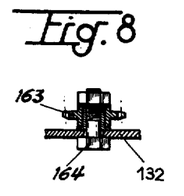

In a port 162 of the sidewall 132 is revolvably fitted a wheel 163 over which the chain 155 passes, as illustrated more particularly in FIG. 8. Said wheel is fitted through the bolts 164 at the desired level in the port 162, so as to allow adjusting the tensioning of the chain 155.

The arrangement described ensures, through a rotation in either direction of the motor 14, assuming the output clutch is engaged, a rotation in the corresponding direction of the arm 9 round the axis 8 coaxial with the stub shafts 157, 157'. It will be remarked, however, that the presence of the bottom 159 allows the rotation of the arm 9 only for those positions for which the clamping means extend underneath the plane occupied by them when inoperative.

If, for any fortuitous reason, the transmission between the motor 14 and the arm 9 is locked and prevents the return of the arm 9 into its inoperative position, a traction exerted on the cable 106 and transmitted to the cable 143 through the attaching means 105 would ensure a disconnection, which allows the arm 9 to return into its inoperative position under the actual weight of the motor 15. It is thus always possible to remove the handling apparatus out of the chamber in which it is to operate.

Figure 9:
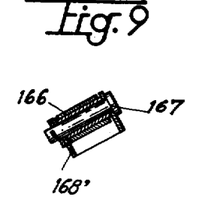

As to the front portion of the container 17, the latter is entirely similar to the portion which has been described with reference to FIGS. 2b and 3b, the container terminating with a plate 165 on which is revolvably carried a roller 166, the details of which appear in FIG. 9, said roller being revolvable over a shaft 167 secured, for instance, by a pin to two lugs 168 and 168' formed by the flanges bent at 90° of a plate welded to the terminal plate 165. Said roller has for its object to prevent any friction of an article conveyed by the clamping means 10, before it is dropped inside the container 17. The arm 9 includes chiefly the motor 15 and the clamping means 10, the whole arrangement pivoting round the axis of the two stub shafts 157 and 157'. The output shaft 169 of the motor 15 which is suitably carried by a bearing housed inside the nose 170 of the motor drives freely revolvable worm 171, the outer end of which revolves in another bearing 172 fitted inside a socket 173 secured to the nose 170 of the motor and provided with two lateral openings.

The worm cooperates with a nut 174 provided with two lugs 175 and 175' to which are pivotally secured two arms 176 and 176', the outer ends of which are pivotally secured to the rear ends 177 and 177' of the arms of the clamping means 10. These two arms, the front sections of which, 178 and 178', form the actual clip jaws are secured through pins and pivotally interconnected through a spindle 179 fitted between two lugs 180 and 181 rigid with the socket 173.

It is apparent that any rotation of the motor 15 in either direction will produce a translational movement of the nut 174 in a corresponding direction, so as to open the clip jaws or to close them until the rearmost position of the nut 174 is reached. Said movement allows grasping between the clip jaws 178 and 178' the article to be handled.

In brief, the arrangement disclosed allows handling an article adapted to be clamped and it may also serve for the removal of dust or the like particles, the size of which is too small to allow their engagement by the clip and this may be obtained by means of a suction pipe extending in parallelism with the handling apparatus inside the tunnel and the end of which, in its turn, is grasped by the clip jaws.

However, in accordance with a modification of the present invention, which modification is of a particular interest, it is also possible to arrange the suction pipe inside the sliding drawer 16, said pipe terminating with a nozzle adapted to take the place of the container 17. It is then possible to secure to said nozzle a portion of a pipe adapted to be grasped by the clip jaws, said modification being illustrated more particularly in FIGS. 10 to 12.

Figure 10:
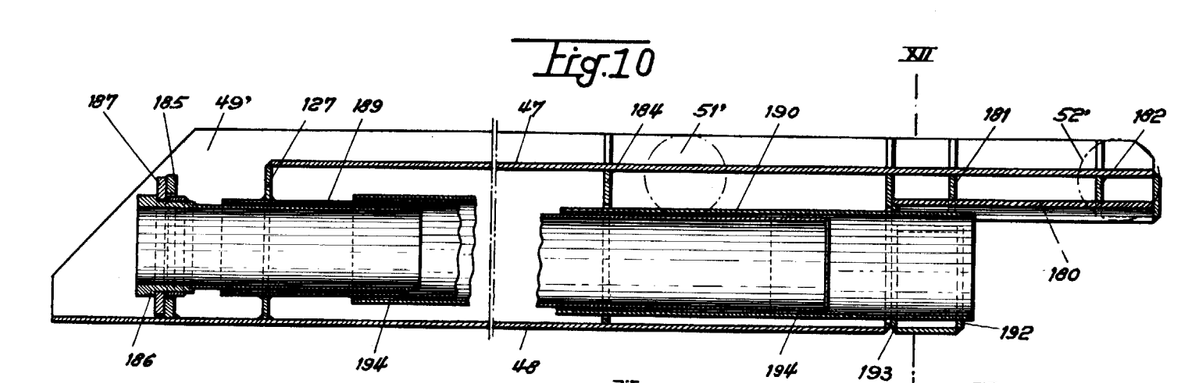
FIG. 10 is a longitudinal cross-section of a particularly interesting modification of one of the members forming part of the handling apparatus.
Figure 11:
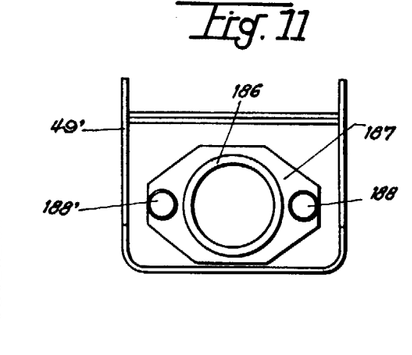
FIG. 11 is a front view of the member illustrated in FIG. 10.
Figure 12:
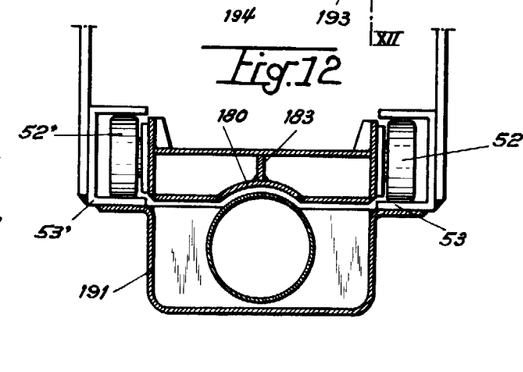
FIG. 12 is a cross-section through line XII—XII of FIG. 10.

In said figures, the sliding drawer described with reference to the preceding figures is again shown without any modification in its general structure. It includes, as precedingly, a bottom 48, two sidewalls 49 and 49' and an upper plate 47. The rollers carrying it are again the same as precedingly, as shown at 51, 51' and 52, 52'.

However, at the rear the sliding drawer is provided with a section of a flatter outline, its lower wall being constituted by a metal sheet 180, while its rigidity is ensured by a number of transverse stiffening sheets 181 and 182 and by a longitudinal sheet 183.

On the other hand, the sliding drawer is provided, in addition to the transverse partition 127, with a number of further transverse stiffening partitions such as 184. Lastly, the front plate 128 adapted to carry the container has been replaced by a plate 185 provided with a circular opening. It is possible to introduce into said system, through suitably shaped circular openings, a telescopic pipe terminating at its front with a nozzle 186 rigid with a plate 187 suitably secured at 188 and 188' to the plate 185. Said nozzle engages fluid tightly a pipe section 189 rigid with the plate 127. Over the pipe section 189 may slide a further pipe section engaging the rear end of the sliding drawer and rigid with the arm 2, as provided by a bracket welded underneath the channel irons 53 and 53' forming the rails guiding the rollers 51, 51' and 52, 52', said bracket including a U-shaped member 191 constituted by a sheet with outwardly extending flanges rigid with the two transverse plates 192 and 193 to which the tube section 190 is rigidly secured. At 193 and 194 are provided packings which ensure the desired fluidtightness between the two sections 189 and 190.

The arrangement which has just been described operates as follows: when the sliding drawer 16 moves with reference to the arm 2, the tube section 189 slides inside the pipe section 190, fluid tightness being ensured at any moment. Over the nozzle 186 is fitted a hose adapted to be engaged by the clip 10 when the drawer is in its forward position, so as to provide for the cleaning of the soiled parts. At its rear end, the tube section 190, which is stationary with reference to the body of the handling apparatus, is suitably connected with a hose extending out of the tunnel. When it is desired to use the handling apparatus for articles which may be grasped by the clip, it is sufficient to release the plate 187 and to remove it together with the nozzle 186 rigid therewith. The plate 185 may then be used instead of the preceding plate 128 for the positioning of the container 17.

Obviously, the embodiment which has just been described has been given solely by way of example, without any binding sense being attached thereto. In particular, mechanical means ensuring transmission between the different motors and the parts controlled thereby may be subjected to various modifications without unduly widening the scope of the invention as defined in the accompanying claims.

What we claim is:

1. A handling apparatus, mountable in a tunnel, comprising: an elongated first arm and means supporting same for movement in the direction of its lengthwise extent; means carried by said first arm for moving same in the direction of its lengthwise extent; a second arm mounted on the front end of said first arm for pivotal movement about a first pivot axis which extends transverse to the lengthwise extent of said first arm, said second arm extending from said first arm in the direction of the lengthwise extent of said first arm; means for effecting pivotal movement of said second arm with respect to said first arm about said first pivot axis; a third arm mounted on the front end of the second arm for pivotal movement about a second pivot axis perpendicular to said first pivot axis and transverse to the lengthwise extent of said first arm; means for effecting pivotal movement of said third arm with respect to said second arm; clamping means carried by said third arm and means for opening and closing said clamping means.

2. A handling apparatus according to claim 1 wherein said means for effecting pivotal movement of said second arm is mounted on said first arm, said means for effecting pivotal movement of said third arm is mounted on said second arm and said means for opening and closing said clamping means is mounted on said third arm.

3. A handling apparatus according to claim 2 wherein said first arm has two sets of rollers rotatably mounted thereon for rotation about two mutually perpendicular axes, and said means for moving said first arm is an electric motor connected for rotating one of said sets of rollers.

4. A handling apparatus according to claim 2 wherein the means for effecting pivotal movement of one arm with respect to the adjacent preceding arm comprises an electric motor on the preceding arm, a first gear driven by said motor, a spindle mounted on said one arm and pivotally connecting said one arm and the preceding arm, a second gear drivingly connected to said spindle, said second gear being adapted to mesh with said first gear.

5. A handling apparatus according to claim 2 wherein said first arm has two sets of rollers rotatably mounted thereon for rotation about two mutually perpendicular axes and said means for moving said first arm is an electric motor connected for rotating one of said sets of rollers; and the means for effecting pivotal movement of one arm with respect to the adjacent preceding arm comprising an electric motor on the preceding arm, a first gear driven by said motor, a spindle secured to said one arm and pivotally connecting said one arm and the adjacent preceding arm, a second gear drivingly connected to said spindle, said second gear being adapted to mesh with said first gear.

6. A handling apparatus according to claim 2 wherein the respective means for effecting pivotal movement of said second and third arms include a clutch, said clutches when disengaged permitting said arms to be moved into alignment; and cable means extending along said arms for moving said clutches from their engaged to their disengaged positions.

7. A handling apparatus according to claim 2 wherein the means for effecting pivotal movement of one arm with respect to the adjacent preceding arm comprises an electric motor on the preceding arm, a first gear driven by said motor, a spindle mounted on said one arm and pivotally connecting said one arm and the preceding arm, a second gear drivingly connected to said spindle, said second gear being adapted to mesh with said first gear; the respective means for effecting pivotal movement of said second and third arms include a clutch, said clutches when disengaged permitting said arms to be moved into alignment; and cable means extending along said arms for moving said clutches from their engaged to their disengaged positions.

8. A handling apparatus according to claim 2 wherein said means for opening and closing said clamping means comprises an electric motor, a worm driven by said electric motor, a nut threaded onto said worm, a pair of arms pivotally connected at one end thereof to said nut, a pair of clamping jaws and means pivotally connecting said jaws to the other ends of said arms.

9. A handling apparatus according to claim 8 wherein said first arm has two sets of rollers rotatably mounted thereon for rotation about two mutually perpendicular axes, and said means for moving said first arm is an electric motor connected for rotating the rollers of one of said sets.

10. A handling apparatus according to claim 8 wherein the respective means for effecting pivotal movement of the second and third arms include a clutch, said clutches when disengaged permitting said arms to be moved into alignment; and cable means extending along said arms for moving said clutches from their engaged to their disengaged positions.

11. A handling apparatus according to claim 10 wherein said first arm has two sets of rollers rotatably mounted thereon for rotation about two mutually perpendicular axes, and said means for moving said first arm is an electric motor connected for rotating the rollers of one of said sets; and the means for effecting pivotal movement of one arm with respect to the adjacent preceding arm comprises an electric motor on the preceding arm, a first gear driven by said motor, a spindle mounted on said one arm and pivotally connecting said one arm and the preceding arm, a second gear drivingly connected to said spindle, said second gear being adapted to mesh with said first gear.

12. A handling apparatus according to claim 2 including a drawer and means mounting same for sliding movement along said first arm; an electric motor on said first arm; an elongated element driven by said electric motor; means mounted on said drawer and engaging said elongated element so that movement of said element effects movement of said drawer with respect to said first arm; and a container mounted on the front end of said drawer and extending along said second arm.

13. A handling apparatus according to claim 12 wherein the respective means for effecting pivotal movement of said second and third arms include a clutch, said clutches when disengaged permitting said arms to be moved into alignment; and cable means for moving said clutches from their engaged to their disengaged positions.

14. A handling apparatus according to claim 13 wherein the means for effecting pivotal movement of one arm with respect to the adjacent preceding arm comprises an electric motor on the preceding arm, a first gear driven by said motor, a spindle mounted on one arm and pivotally connecting said one arm and the preceding arm, a second gear drivingly connected to said spindle, said second gear being adapted to mesh with said first gear; said first arm having two sets of rollers rotatably mounted thereon for rotation about two mutually perpendicular axes, and said means for moving said first arm is an electric motor connected for rotating the rollers of one of said sets.

15. A handling apparatus according to claim 12 wherein said means for opening and closing said clamping means comprises an electric motor, a worm driven by said electric motor, a nut threaded onto said worm, a pair of arms pivotally connected at one end thereof to said nut, a pair of clamping jaws and means pivotally connecting said jaws to the other ends of said arms; said first arm having two sets of rollers mounted thereon for rotation about two mutually perpendicular axes, and said means for moving said first arm is an electric motor connected for rotating the rollers of one of said sets; the means for effecting pivotal movement of one arm with respect to the adjacent preceding arm comprising an electric motor on the preceding arm, a first gear driven by said motor, a spindle mounted to said one arm and pivotally connecting said one arm and the preceding arm, a second gear drivingly connected to said spindle, said second gear being adapted to mesh with said first gear.

16. A handling apparatus according to claim 2 including a drawer and means mounting said drawer for sliding movement along said first arm; an electric motor on said first arm; a chain driven by said electric motor; a pair of jaws mounted on said drawer and engaging said chain so that movement of said chain effects movement of said drawer; the respective means for effecting pivotal movement of said second and third arms including a clutch, said clutches when disengaged permitting said arms to be moved into alignment; and cable means extending along said arms for moving said clutches from their engaged to their disengaged positions.

17. A handling apparatus according to claim 2 including a drawer and means mounting said drawer for sliding movement along said first arm; an electric motor on said first arm; a chain driven by said electric motor; a pair of jaws mounted on said drawer and engaging said chain so that movement of said chain effects movement of said drawer; said means for opening and closing said clamping means comprising an electric motor, a worm driven by said electric motor, a nut threaded onto said worm, a pair of arms pivotally connected at corresponding ends thereof on said nut; a pair of clamping jaws and means pivotally connecting said jaws to the other ends of said arms; the respective means for effecting pivotal movement of said second and third arms including a clutch, said clutches when disengaged permitting said arms to be moved into alignment; and cable means extending along said arms for moving said clutches from their engaged to their disengaged positions; said first arm having two sets of rollers rotatably mounted thereon for rotation about two mutually perpendicular axes, said means for moving said first arm being an electric motor connected for rotating the rollers of one of said sets, the means for effecting pivotal movement of one arm with respect to the adjacent preceding arm comprising an electric motor on the preceding arm, a first gear driven by said motor, a spindle mounted on said one arm and pivotally connecting said one arm and the preceding arm, a second gear drivingly connected to said spindle, said second gear being adapted to mesh with said first gear.

18. A handling apparatus according to claim 2 including a drawer and means mounting said drawer for sliding movement along said first arm; an electric motor on said first arm; means for effecting movement of said drawer with respect to said first arm; a telescoping tube structure including a first tube mounted on said drawer and having a nozzle at its forward end and a second tube mounted on said first arm and telescopically receiving said first tube.

19. A handling apparatus according to claim 18 wherein the respective means for effecting pivotal movement of said second and third arms include a clutch, said clutches when disengaged permitting said arms to be moved into alignment; and cable means extending along said arms for moving said clutches from their engaged to their disengaged positions.

20. A handling apparatus according to claim 2 including a drawer and means mounting same for sliding movement along said first arm; an electric motor on said first arm; a chain driven by said electric motor; a pair of jaws mounted on said drawer and engaging said chain so that movement of said chain effects movement of said drawer with respect to said first arm; a telescoping tube structure including a first tube mounted on said drawer and having a nozzle at its forward end and a second tube mounted on said first arm and telescopically receiving said first tube; the respective means for effecting pivotal movement of said second and third arms including a clutch, said clutches when disengaged permitting said arms to be moved into alignment, and cable means for moving said clutches from their engaged to their disengaged positions; said first arm having two sets of rollers rotatably mounted thereon for rotation about two mutually perpendicular axes, said means for moving said first arm being an electric motor connected for rotating the rollers of one of said sets; the means for effecting pivotal movement of one arm with respect to the adjacent preceding arm comprising an electric motor on the preceding arm, a first gear driven by said motor, a spindle mounted on said one arm and pivotally connecting said one arm and the preceding arm, a second gear drivingly connected to said spindle, said second gear being adapted to mesh with said first gear.

21. A handling apparatus according to claim 2 including a drawer and means mounting said drawer for sliding movement along said first arm; an electric motor on said first arm; a chain driven by said electric motor; a pair of jaws mounted on said drawer and engaging said chain so that movement of said chain effects movement of said drawer; telescoping tube structure including a first tube mounted on said drawer and having a nozzle at its forward end and a second tube mounted on said first arm and telescopically receiving said first tube; said means for opening and closing said clamping means comprising an electric motor, a worm driven by said electric motor, a nut threaded onto said worm, a pair of arms pivotally connected at one end thereof to said nut; a pair of clamping jaws and means pivotally connecting said jaws to the other ends of said arms; said first arm having two sets of rollers mounted thereon for rotation about two mutually perpendicular axes, said means for moving said first arm being an electric motor connected for rotating the rollers of one of said sets; the means for effecting pivotal movement of one arm with respect to the adjacent preceding arm comprising an electric motor on the preceding arm, a first gear driven by said motor, a spindle mounted on said one arm and pivotally connecting said one arm and the preceding arm, a second gear drivingly connected to said spindle, said second gear being adapted to mesh with said first gear.

22. A handling apparatus according to claim 2 including a drawer and means mounting said drawer for sliding movement along said first arm; an electric motor on said first arm; a chain driven by said electric motor; a pair of jaws mounted on said drawer and engaging said chain so that movement of said chain effects movement of said drawer with respect to said first arm; a telescoping tube structure including a first tube mounted on said drawer and having a nozzle at its forward end, a second tube mounted on said first arm and telescopically receiving said first tube; the respective means for effecting pivotal movement of said second and third arms including a clutch, said clutches when disengaged permitting said arms to be moved into alignment; and cable means extending along said arms for moving said clutches from their engaged to their disengaged positions.

23. A handling apparatus according to claim 2 including a drawer and means mounting same for sliding movement along said first arm; an electric motor on said first arm; a chain driven by said electric motor; a pair of jaws mounted on said drawer and engaging said chain so that movement of said chain effects movement of said drawer, a telescoping tube structure including a first tube mounted on said drawer and having a nozzle at its forward end and a second tube mounted on said first arm and telescopically receiving said first tube; the respective means for effecting pivotal movement of said second and third arms including a clutch, said clutches when disengaged permitting said arms to be moved into alignment, cable means for moving said clutches from their engaged to their disengaged positions; said first arm having two sets of rollers rotatably mounted thereon for rotation about two mutually perpendicular axes, said means for moving said first arm being an electric motor connected for rotating one of said sets of rollers; the means for effecting pivotal movement of one arm with respect to the adjacent preceding arm comprising an electric motor on the preceding arm, a first gear driven by said motor, a spindle mounted on said one arm and pivotally connecting said one arm and the preceding arm, a second gear drivingly connected to said spindle, said second gear being adapted to mesh with said first gear.

References Cited in the file of this patent

UNITED STATES PATENTS 2,861,699     Yaumans _______________ Nov. 25, 1958